United States Patent
Mankame et al.

(10) Patent No.: US 10,513,211 B2
(45) Date of Patent: Dec. 24, 2019

(54) HAPTIC DEVICE WITH WAVEGUIDE AND SEAT ASSEMBLY HAVING THE SAME

(71) Applicant: GM GLOBAL TECHNOLOGY OPERATIONS LLC, Detroit, MI (US)

(72) Inventors: Nilesh D. Mankame, Ann Arbor, MI (US); Dorel M. Sala, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 15/850,757

(22) Filed: Dec. 21, 2017

(65) Prior Publication Data

US 2019/0193615 A1  Jun. 27, 2019

(51) Int. Cl.
*B60N 2/90* (2018.01)
*G08B 6/00* (2006.01)

(52) U.S. Cl.
CPC .............. *B60N 2/90* (2018.02); *G08B 6/00* (2013.01); *B60N 2002/981* (2018.02)

(58) Field of Classification Search
None
See application file for complete search history.

(56) References Cited

U.S. PATENT DOCUMENTS

| | | | | |
|---|---|---|---|---|
| 4,944,554 A | * | 7/1990 | Gross | A47C 7/462 297/284.3 |
| 6,056,357 A | * | 5/2000 | Fukuoka | B60N 2/502 297/217.3 |
| 9,978,226 B1 | * | 5/2018 | Mankame | B60N 2/986 |
| 2003/0055364 A1 | * | 3/2003 | Knelsen | A47C 7/462 601/46 |
| 2006/0097857 A1 | * | 5/2006 | Osaka | B60Q 9/006 340/435 |
| 2011/0018740 A1 | * | 1/2011 | Boren | G08B 6/00 340/965 |
| 2013/0334853 A1 | * | 12/2013 | Samain | B60N 2/0232 297/284.4 |
| 2014/0246954 A1 | * | 9/2014 | Kwon | G01N 29/2462 310/334 |
| 2016/0129920 A1 | * | 5/2016 | Hall | B60W 50/16 701/1 |
| 2017/0020777 A1 | * | 1/2017 | Yamada | B06B 1/0644 |
| 2018/0036198 A1 | * | 2/2018 | Mergl | A61H 23/004 |
| 2018/0118071 A1 | * | 5/2018 | Sugiyama | B60N 2/90 |
| 2018/0170228 A1 | * | 6/2018 | Kono | B06B 1/045 |

(Continued)

*Primary Examiner* — David E Allred
(74) *Attorney, Agent, or Firm* — Quinn IP Law

(57) ABSTRACT

A haptic device includes a first signal generator embedded in a host and configured to generate a first haptic signal. A first waveguide is operatively connected to and configured to transmit the first haptic signal away from the first signal generator. A first integrator is operatively connected to the first waveguide and configured to receive the first haptic signal. The first waveguide and the first integrator are in mechanical communication with the host. The first waveguide may include a first bent portion characterized by a first bend angle. An additional waveguide may be configured to transmit the first haptic signal to the first integrator. The additional waveguide may include an additional bent portion characterized by a second bend angle. The haptic device may be part of a seat assembly, where the host is at least one of a seat bottom, a seat back and a head rest.

17 Claims, 2 Drawing Sheets

(56) References Cited

U.S. PATENT DOCUMENTS

2018/0192226 A1\* 7/2018 Woelfl .................. H04R 5/033
2019/0142163 A1\* 5/2019 Garrison ................. A47C 7/54
2019/0232863 A1\* 8/2019 Rowell ............... B60Q 1/2669

\* cited by examiner

HAPTIC DEVICE WITH WAVEGUIDE AND SEAT ASSEMBLY HAVING THE SAME

INTRODUCTION

The disclosure relates generally to a haptic device with one or more waveguides and a seat assembly having the same. Haptic devices include elements that produce mechanical vibrations, which are intended to be felt by a user of the device as an alert or feedback mechanism. For example, the vibrating element may be an unbalanced eccentric mass which is attached to a shaft of an electric motor. The vibrations generated by the unbalanced eccentric mass are radiated in all directions.

SUMMARY

Disclosed herein is a haptic device having a first signal generator embedded in a host. Also disclosed herein is a seat assembly having a first signal generator embedded in a host, with the host being at least one of a seat bottom, a seat back and a head rest. The first signal generator is configured to selectively generate a first haptic signal. A first waveguide is operatively connected to and configured to transmit the first haptic signal away from the first signal generator. A first integrator is operatively connected to the first waveguide and configured to receive the first haptic signal. The first waveguide and the first integrator may be at least partially embedded in, bonded to or otherwise in mechanical communication with the host.

The first waveguide may include a first bent portion characterized by a first bend angle. An additional waveguide may be operatively connected to the first signal generator and configured to transmit the first haptic signal to the first integrator. The additional waveguide may include an additional bent portion characterized by a second bend angle. The additional waveguide may be configured to be a mirror image of the first waveguide such that the first bend angle and the second bend angle are approximately equal.

An inertial mass may be operatively connected to the first integrator at a first position, with the first waveguide being operatively connected to the first integrator at a second position. The first integrator may be characterized by a segmented construction with one or more first segments alternating between one or more second segments. The first segments may be configured to be relatively stiff and the second segments may be configured to be relatively flexible.

In one example, the first waveguide includes a solid interior. In another example, the first waveguide defines a hollow interior cavity. A fluid is placed in the hollow interior cavity of the first waveguide such that the first haptic signal is channeled through the fluid towards the first integrator. In one example, the fluid is an incompressible liquid. The respective waveguide may define a first internal surface area ($SA_1$) adjacent to the respective haptic unit and a second internal surface area ($SA_2$) adjacent to the second integrator. When the second internal surface area ($SA_2$) is less than the first internal surface area ($SA_1$), the first haptic signal received at the first integrator is amplified by a factor at least partially proportional to a ratio ($SA_1/SA_2$).

An additional waveguide may be operatively connected to the first signal generator and configured to transmit the first haptic signal to the first integrator. The additional waveguide is spaced from the first waveguide. The first integrator may be configured to integrate the first haptic signal from the first waveguide and the additional waveguide. A second signal generator may be embedded in the host and configured to selectively generate a second haptic signal. The second signal generator is spaced from the first signal generator. A second waveguide is operatively connected to the second signal generator and configured to transmit the second haptic signal. A second integrator is configured to receive the second haptic signal.

A third waveguide is operatively connected to the second signal generator and configured to transmit the second haptic signal. The second integrator is configured to integrate the second haptic signal from the second waveguide and the third waveguide. Because each of the waveguides channel energy from the respective signal generators along a respective directed path, and the integrators that radiate the vibrations are located close to the occupant, cross-talk is reduced, allowing closer packaging of the respective signal generators without loss of discrimination. Additionally, the size of the signal generators required to produce a specified alert signal is reduced.

The above features and advantages and other features and advantages of the present disclosure are readily apparent from the following detailed description of the best modes for carrying out the disclosure when taken in connection with the accompanying drawings.

DETAILED DESCRIPTION

Figure 1:
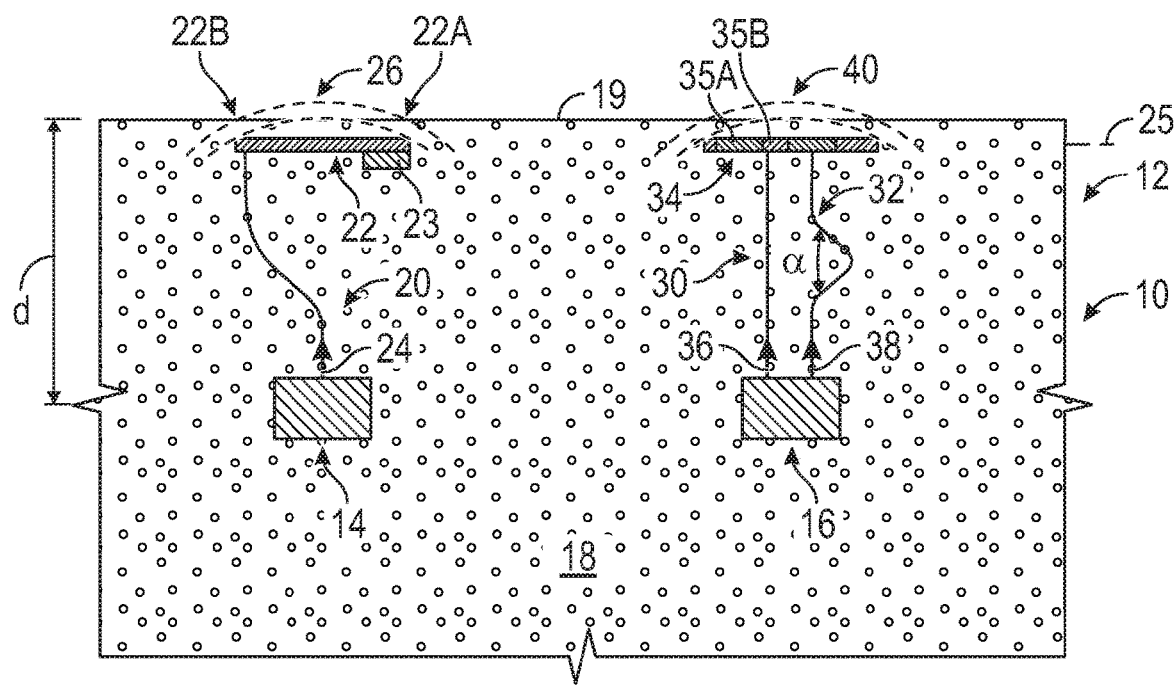
FIG. 1 is a schematic fragmentary side view of an example haptic device.

Referring to the FIGS., wherein like reference numbers refer to the same or similar components throughout the several views, FIG. 1 is a schematic cross-sectional view of a portion of a haptic device 10, which may be part of an apparatus 12. The apparatus 12 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other transportation device. The apparatus 12 may be a non-mobile platform, including but not limited to, a theater seat, gaming seat, a seat for an operator who controls complex machinery and an air traffic controller seat. The apparatus 12 may take many different forms and include multiple and/or alternate components and facilities.

Referring to FIG. 1, the haptic device 10 includes a first signal generator 14 embedded in a host 18 and configured to selectively generate a first haptic signal. A second signal generator 16 may be embedded in the host 18. The host 18 defines an exterior surface 19. In one example, the host 18 is composed of closed-cell foam. A first waveguide 20 is configured to transmit the first haptic signal in the form of a translatory vibration (see first signal 24). A first integrator 22 is configured to receive the first haptic signal. Referring to FIG. 1, the first integrator 22 may extend in a reference plane 25 and the first waveguide 20 may extend in a waveguide plane (in the plane of the page) substantially orthogonal to the reference plane 25. The vibrations produced by the first signal generator 14 propagate through the first waveguide 20 through most of the thickness ("d" in FIG. 1) and through the host 18 between the reference plane 25 and the exterior surface 19. The strength of the first haptic signal is dictated by the desired vibration intensity at the exterior surface 19. In other words, the first haptic signal is configured to have sufficient intensity to be discernable by a user (not shown) in contact with the exterior surface 19. The first waveguide 20 may include a solid interior. In one example, the first waveguide 20 is composed of a metal. In another example, the first waveguide 20 is composed of a polyethylene or other polymer.

The method of generating the vibration via the first signal generator 14 may be varied based on the application at hand. For example, the first signal generator 14 may include a piezoelectric element (not shown). Alternatively, the first signal generator 14 may include an electric motor (not shown) with an unbalanced eccentric mass, generating vibrations that are radiated in an omni-directional manner. The first signal generator 14 may include a voice coil motor and/or a linear resonant actuator. The first waveguide 20 is configured to efficiently channel the vibrational excitation towards the first integrator 22. This enables a smaller unit for a given surface acceleration and packaging depth. The vibrations generated may be transferred along the first waveguide 20 at least partially as longitudinal (for infinitely thick media) and quasi-longitudinal (for media with finite thicknesses) waves.

Referring to FIG. 1, the first integrator 22 may be configured to integrate the first haptic signal from the first waveguide 20 into a transmitted wave 26 that travels through or along the first integrator 22. The transmitted wave 26 may at least partially include transverse shear waves, flexural waves, bulk waves, surface waves, travelling waves, static waves, various combinations thereof and other waves. The nature of the transmitted wave 26 created in the first integrator 22 depends on various attributes of the system design. These attributes include the in-plane stiffness and out-of-plane stiffness of the first integrator 22, the inertial properties of the first integrator 22, the modulus of the host 18, the stiffness of the first waveguide 20, the dimensions of the interface between the first waveguide 20 and the first integrator 22, the angle at which the first waveguide 20 attaches to the first integrator 22 and other factors. Additionally, some of the energy carried by the first haptic signal may be reflected back into the first waveguide 20.

The first integrator 22 may be shaped as a relatively thin plate. Referring to FIG. 1, an inertial mass 23 may be operatively connected to the first integrator 22 at a first position 22A, with the first waveguide 20 being operatively connected to the first integrator 22 at a second position 22B. The inertial mass 23 is configured to provide an inertial anchor for the first integrator 22. In one example, referring to FIG. 1, the first position 22A is opposite to the second position 22B. The inertial mass 23 is configured to hold down the first integrator 22 at the first position 22A when the second position 22B goes up due to actuation of the first signal generator 14. This configuration enables a single signal generator to generate a wider variety of waves (including but not limited to, bending waves, standing waves, travelling waves) than is possible in the first integrator plate 22 without the inertial mass 23. The first integrator 22 (and other integrators described below) is configured to have a low aspect ratio. The first integrator 22 (and other integrators described below) may be configured to be relatively flexible in shear and bending and relatively stiff in tension.

As described herein, the haptic device 10 may include multiple signal generators and multiple waveguides for each respective signal generator. A single waveguide is sufficient to produce a single translatory vibration in the integrators described herein. It is to be understood that the number of signal generators and waveguides per signal generator may be selected based on the application at hand. Referring to FIG. 1 and as noted above, a second signal generator 16 may be embedded in the host 18 and configured to generate a second haptic signal, with the second signal generator 16 being spaced from the first signal generator 14. Referring to FIG. 1, the haptic device 10 may include at least two wave guides (such as a second waveguide 30 and a third waveguide 32) for each respective signal generator (such as second signal generator 16) to produce a shear and/or a bending vibration (stationary or travelling wave) at the second integrator 34. The second signal generator 16 is operatively connected to the second waveguide 30 and the third waveguide 32. The second waveguide 30 and the third waveguide 32 are configured to transmit the second haptic signal in the form of a respective vibration/wave (see second signal 36 and third signal 38). Referring to FIG. 1, a second integrator 34 is configured to receive the second haptic signal. The second integrator 34 may be configured to integrate the second haptic signal from the second waveguide 30 and the third waveguide 32 into a transmitted wave 40 (similar to transmitted wave 26, see discussion above).

The second integrator 34 (or other integrators described herein) may be characterized by a segmented construction with one or more first segments 35A alternating between one or more second segments 35B. The first segments 35A may be configured to be relatively stiff and the second segments 35B may be configured to be relatively flexible. In another example, the first segments 35A may be configured to be relatively thick while the second segments 35B may be configured to be relatively thin. These configurations enable greater support of waves with a large shear component.

Figure 2:
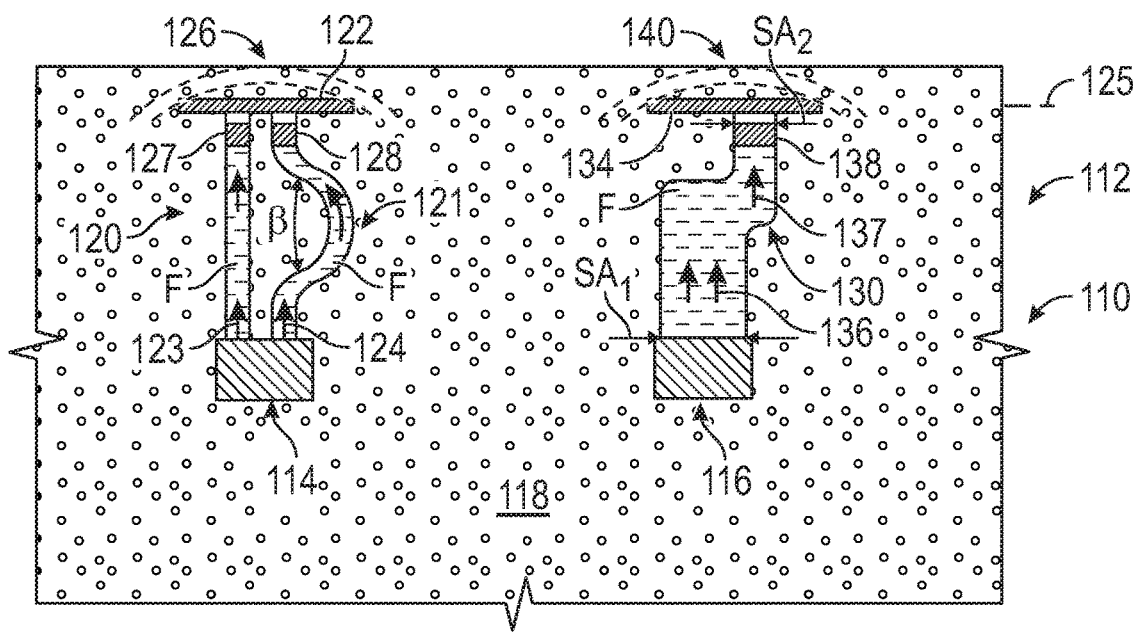
FIG. 2 is a schematic fragmentary side view of another example haptic device.

Referring now to FIG. 2, another example of a haptic device 110 is shown, which may be part of an apparatus 112 (similar to apparatus 12 described above). The haptic device 110 includes first signal generator 114 embedded in the host 118. A first waveguide 120 and a second waveguide 121 are configured to transmit the first haptic signal in the form of a respective translatory vibration (see first signal 123 and second signal 124). Referring to FIG. 2, a first integrator 122 is configured to receive the first haptic signal. The first integrator 122 may be configured to integrate the first signal 123 and second signal 124 (from the first waveguide 120 and the second waveguide 121, respectively) into a transmitted wave 126 (similar to transmitted wave 26, see discussion above).

Referring to FIG. 2, a second signal generator 116 may be embedded in the host 118 and configured to generate a second haptic signal. A third waveguide 130 is configured to transmit the second haptic signal (see third signal 136). Referring to FIG. 2, a second integrator 134 is configured to receive the second haptic signal. The first integrator 122 and the second integrator 134 may extend in a reference plane 125. The first waveguide 120, second waveguide 121 and the third waveguide 130 may be positioned in a waveguide plane (in the plane of the page) substantially orthogonal to the reference plane 125.

Referring to FIG. 2, the first waveguide 120, the second waveguide 121 and the third waveguide 130 each define a respective hollow interior cavity at least partially filled with a fluid F. The fluid F is placed in the respective hollow interior cavities of the first waveguide 120 and second waveguide 121 such that the first haptic signal is channeled through the fluid F towards the first integrator 122. Similarly, the second haptic signal propagates through the fluid F in the third waveguide 130 towards the second integrator 134. The first waveguide 120 and second waveguide 121 may include a first piston 127 and a second piston 128, respectively, adjacent to the first integrator 122. The third waveguide 130 may include a third piston 138 adjacent to the second integrator 134.

The fluid F may be a gas, such as air, or a liquid. In one example, the fluid F is an incompressible liquid, such as a hydraulic fluid. In another example, the fluid F is a shear thickening liquid. When the first signal generator 114 is inactive, the shear thickening fluid would behave like a regular fluid and minimize the impact of the first and second wave guides 120, 121 on occupant comfort. When the first signal generator 114 is activated, the shear thickening fluid thickens and behaves more like a solid, thereby transmitting an increased amount of energy. In one example, the shear thickening fluid includes colloidal dispersions of clay in water or colloidal dispersions of latex in a suitable solvent. The composition of the fluid F may be varied based on the application at hand.

The waveguides described herein may be configured to have a variable width or diameter along their respective lengths. For example, referring to FIG. 3, the third waveguide 130 defines a first internal surface area (shown as $SA_1$ in FIG. 2) adjacent to the second signal generator 116 and a second internal surface area (shown as $SA_2$ in FIG. 2) adjacent to the second integrator 134. Because the pressure on the fluid F is distributed equally throughout and acts on the entire surface area of the third piston 138, the second haptic signal may be selectively amplified. When the second internal surface area ($SA_2$) is less than the first internal surface area ($SA_1$), the second haptic signal received at the second integrator 134 is amplified by a factor proportional to the ratio ($SA_1/SA_2$). Alternatively, the second internal surface area ($SA_2$) may be configured to be greater than the first internal surface area ($SA_1$) [$SA_2>SA_1$]. Referring to FIG. 2, the second integrator 134 may be configured to integrate the amplified signal 137 into a transmitted wave 140 (similar to transmitted wave 26, see discussion above, shown in FIG. 2.

Figure 3:
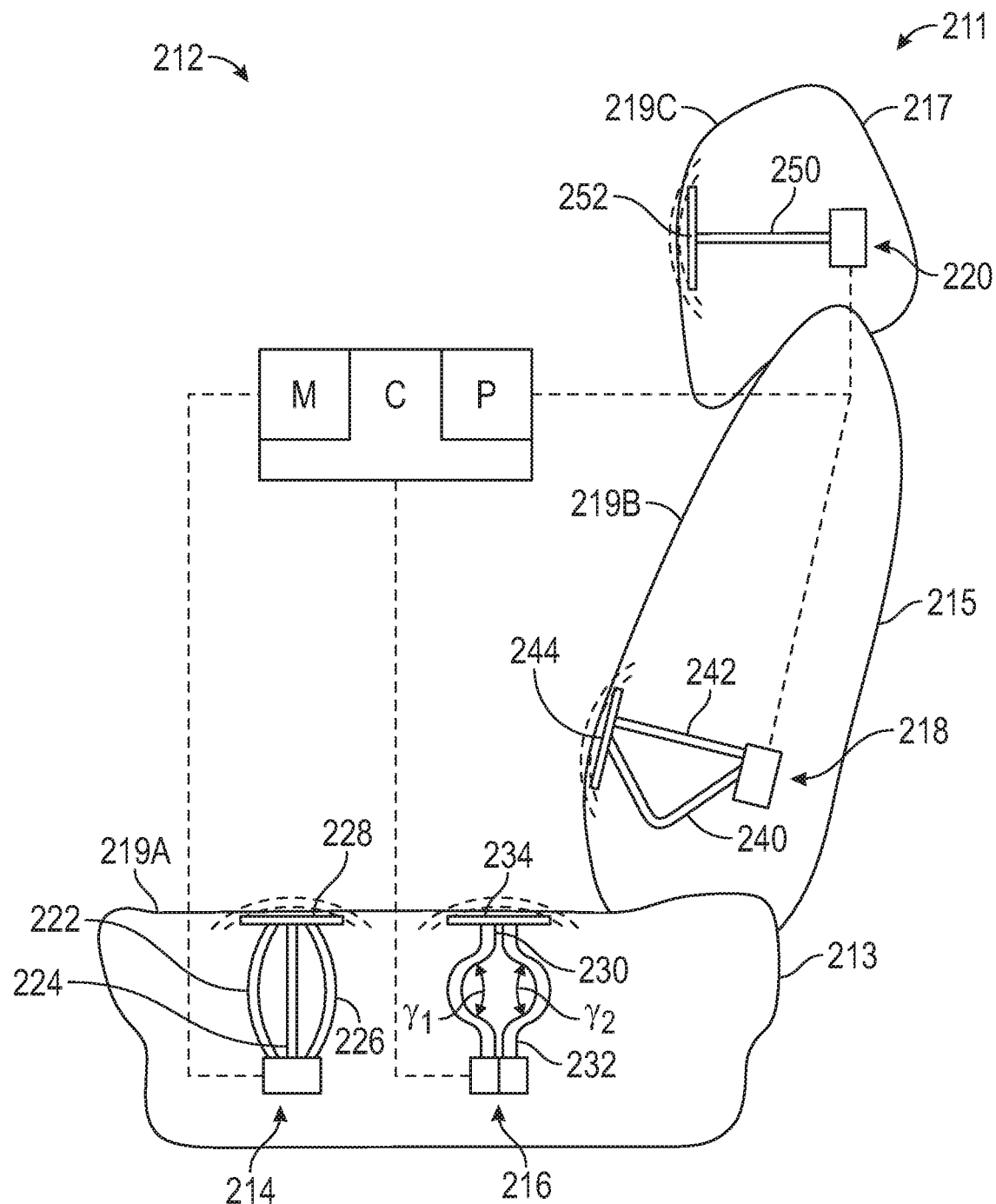
FIG. 3 is schematic side view of an example seat assembly having a plurality of haptic devices.

Referring to FIG. 3, a schematic side view of an example seat assembly 211 is shown. The seat assembly 211 may be a part of an apparatus 212 (similar to apparatus 12 as described above). The seat assembly 211 includes one or more signal generators, such as a first signal generator 214, a second signal generator assembly 216, a third signal generator 218 and a fourth signal generator 220, embedded in a respective host. Referring to FIG. 3, the respective host is at least one of a seat bottom 213, a seat back 215 and a head rest 217. The first signal generator 214, the second signal generator assembly 216, the third signal generator 218 and the fourth signal generator 220 are configured to generate respective haptic signals in response to respective command signals from a controller C. The respective haptic signals are configured to be discernable to a user (not shown) in contact with the respective exterior surfaces 219A, 219B and 219C.

The controller C may include at least one processor P and at least one memory M (or any non-transitory, tangible computer readable storage medium) on which are recorded instructions for when to issue the respective command signals. For example, if the apparatus 212 is a vehicle, the respective command signals may be issued and the respective haptic signals activated after a turn signal indicator has been turned on for greater than a threshold time in order to alert the driver of this condition. The memory M can store controller-executable instruction sets, and the processor P can execute the controller-executable instruction sets stored in the memory M.

Referring to FIG. 3, the first signal generator 214 is operatively connected to a first integrator 228, via waveguides 222, 224 and 226. The second signal generator assembly 216 includes two separate signal generators connected by separate waveguides 230, 232 to a single integrator 234. The third signal generator 218 is operatively connected to a third integrator 244, via waveguides 240, 242. The fourth signal generator 220 is operatively connected to a fourth integrator 252, via waveguide 250.

Each of the respective waveguides described with respect to FIGS. 1-3 may include respective bent portions in order to decouple or reduce their respective global stiffness. A variety of shapes and sizes may be employed for the respective waveguides. In one example, referring to FIG. 1, the third waveguide 32 includes a first bent portion characterized by a first bend angle (labeled as a in FIG. 1). In another example, referring to FIG. 2, the second waveguide 121 includes a second bent portion characterized by a second bend angle (labeled as β in FIG. 2). The first bend angle (α in FIG. 1) and the second bend angle (β in FIG. 2) may be between approximately 45 and 90 degrees. In another example, referring to FIG. 3, a pair of waveguides (such as waveguides 230, 232 having respective bend angles labeled as $\gamma_1$ and $\gamma_2$ in FIG. 3) are configured to be mirror images of one other, with their respective bend angles ($\gamma_1$ and $\gamma_2$) being approximately equal.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A haptic device comprising:
a first signal generator embedded in a host and configured to selectively generate a first haptic signal;
a first waveguide operatively connected to and configured to transmit the first haptic signal away from the first signal generator;
a first integrator operatively connected to the first waveguide and configured to receive the first haptic signal, the first waveguide and the first integrator being in mechanical communication with the host; and
a first additional waveguide operatively connected to the first signal generator and configured to transmit the first haptic signal to the first integrator, the first additional waveguide being spaced from the first waveguide;
wherein the first integrator is configured to integrate the first haptic signal from the first waveguide and the first additional waveguide; and
wherein the first waveguide includes a first bent portion characterized by a first bend angle.

2. The haptic device of claim 1, wherein:
the additional waveguide is operatively connected to the first signal generator and configured to transmit the first haptic signal to the first integrator, the additional waveguide being spaced from the first waveguide; and wherein the additional waveguide includes an additional bent portion characterized by a second bend angle.

3. The haptic device of claim 1, further comprising:

an inertial mass operatively connected to the first integrator at a first position, the first waveguide being operatively connected to the first integrator at a second position.

4. The haptic device of claim 1, wherein:

the first integrator is characterized by a segmented construction with one or more first segments alternating between one or more second segments; and the first segments are configured to be relatively stiff and the second segments are configured to be relatively flexible, relative to each other.

5. The haptic device of claim 1, wherein:

the first waveguide defines a hollow interior cavity; and further comprising:

a fluid placed in the hollow interior cavity of the first waveguide such that the first haptic signal is channeled through the fluid towards the first integrator.

6. The haptic device of claim 5, wherein:

the first waveguide defines a first internal surface area ($SA_1$) adjacent to the first signal generator and a second internal surface area ($SA_2$) adjacent to the first integrator, the second internal surface area ($SA_2$) being less than the first internal surface area ($SA_1$); and the first haptic signal received at the first integrator is amplified by a factor at least partially proportional to a ratio ($SA_1/SA_2$).

7. The haptic device of claim 1, further comprising:

a second signal generator embedded in the host and configured to selectively generate a second haptic signal, the second signal generator being spaced from the first signal generator;

a second additional waveguide operatively connected to the second signal generator and configured to transmit the second haptic signal; and a second integrator configured to receive the second haptic signal.

8. The haptic device of claim 7, further comprising:

a third additional waveguide operatively connected to the second signal generator and configured to transmit the second haptic signal; and wherein the second integrator is configured to integrate the second haptic signal from the second additional waveguide and the third additional waveguide.

9. A seat assembly comprising:

a host and a first signal generator embedded in the host, the host being at least one of a seat bottom, a seat back and a head rest;

wherein the first signal generator is configured to selectively generate a first haptic signal;

a first waveguide operatively connected to and configured to transmit the first haptic signal away from the first signal generator;

a first integrator operatively connected to the first waveguide and configured to receive the first haptic signal, the first waveguide and the first integrator being in mechanical communication with the host; and a first additional waveguide operatively connected to the first signal generator and configured to transmit the first haptic signal to the first integrator, the first additional waveguide being spaced from the first waveguide;

wherein the first integrator is configured to integrate the first haptic signal from the first waveguide and the first additional waveguide.

10. The seat assembly of claim 9, wherein:

the first waveguide includes a first bent portion characterized by a first bend angle.

11. The seat assembly of claim 10, further comprising:

a first additional waveguide operatively connected to the first signal generator and configured to transmit the first haptic signal to the first integrator, the first additional waveguide being spaced from the first waveguide; and wherein the first additional waveguide includes an additional bent portion characterized by a second bend angle.

12. The seat assembly of claim 9, further comprising:

an inertial mass operatively connected to the first integrator at a first position, the first waveguide being operatively connected to the first integrator at a second position.

13. The seat assembly of claim 9, wherein:

the first integrator is characterized by a segmented construction with one or more first segments alternating between one or more second segments; and the first segments are configured to be relatively stiff and the second segments are configured to be relatively flexible, relative to each other.

14. The seat assembly of claim 9, wherein:

the first waveguide defines a hollow interior cavity; and further comprising:

a fluid placed in the hollow interior cavity of the first waveguide such that the first haptic signal is channeled through the fluid towards the first integrator.

15. The seat assembly of claim 14, wherein:

the first waveguide defines a first internal surface area ($SA_1$) adjacent to the first signal generator and a second internal surface area ($SA_2$) adjacent to the first integrator, the second internal surface area ($SA_2$) being less than the first internal surface area ($SA_1$); and the first haptic signal received at the first integrator is amplified by a factor at least partially proportional to a ratio ($SA_1/SA_2$).

16. The seat assembly of claim 9, further comprising:

a separate signal generator embedded in the host and configured to generate a separate haptic signal, the separate signal generator being spaced from the first signal generator;

a separate waveguide operatively connected to the separate signal generator and configured to transmit the separate haptic signal to the first integrator.

17. A seat assembly comprising:

a host and a first signal generator embedded in the host, the host being at least one of a seat bottom, a seat back and a head rest;

wherein the first signal generator is configured to selectively generate a first haptic signal;

a first waveguide operatively connected to and configured to transmit the first haptic signal away from the first signal generator, the first waveguide defining a hollow interior cavity;

a first integrator operatively connected to the first waveguide and configured to receive the first haptic signal, the first waveguide and the first integrator being in mechanical communication with the host;

a fluid placed in the hollow interior cavity of the first waveguide such that the first haptic signal is channeled through the fluid towards the first integrator;

an inertial mass operatively connected to the first integrator at a first position, the first waveguide being operatively connected to the first integrator at a second position;

wherein the first waveguide defines a first internal surface area ($SA_1$) adjacent to the first signal generator and a second internal surface area ($SA_2$) adjacent to the first integrator, the second internal surface area ($SA_2$) being less than the first internal surface area ($SA_1$);

wherein the first haptic signal received at the first integrator is amplified by a factor at least partially proportional to a ratio ($SA_1/SA_2$); and wherein the first integrator is characterized by a segmented construction with one or more first segments alternating between one or more second segments, the first segments are configured to be relatively stiff and the second segments are configured to be relatively flexible, relative to each other.

* * * * *